(12) United States Patent
Palmer et al.

(10) Patent No.: US 12,052,377 B2
(45) Date of Patent: Jul. 30, 2024

(54) ENVIRONMENTALLY DEPENDENT PHYSICALLY UNCLONABLE FUNCTION DEVICE

(71) Applicant: TTP Plc., Royston (GB)

(72) Inventors: Timothy John Palmer, Royston (GB); Michael Beck, Royston (GB)

(73) Assignee: TTP Plc, Royston (GB)

( * ) Notice: Subject to any disclaimer, the term of this patent is extended or adjusted under 35 U.S.C. 154(b) by 127 days.

(21) Appl. No.: 17/620,421

(22) PCT Filed: Jun. 18, 2020

(86) PCT No.: PCT/GB2020/051476
§ 371 (c)(1),
(2) Date: Dec. 17, 2021

(87) PCT Pub. No.: WO2020/254811
PCT Pub. Date: Dec. 24, 2020

(65) Prior Publication Data
US 2022/0239506 A1    Jul. 28, 2022

(30) Foreign Application Priority Data
Jun. 18, 2019    (GB) ...................................... 1908679

(51) Int. Cl.
*H04L 9/32* (2006.01)
*H03K 19/003* (2006.01)
*H03K 19/17768* (2020.01)

(52) U.S. Cl.
CPC ..... *H04L 9/3278* (2013.01); *H03K 19/00384* (2013.01); *H03K 19/17768* (2013.01); *H04L 2209/12* (2013.01)

(58) Field of Classification Search
CPC ... H04L 9/3278; H04L 9/0816; H04L 9/0866; H04L 2209/12; G06F 21/75
See application file for complete search history.

(56) References Cited

U.S. PATENT DOCUMENTS 9,390,295 B2    7/2016  Franciscus Widdershoven et al.
10,256,983 B1*  4/2019  Bauer ................... H04L 9/0861
(Continued)

FOREIGN PATENT DOCUMENTS

EP    2337263 A1    6/2011
WO    2012123400 A1  9/2012

OTHER PUBLICATIONS

PCT Patent Application PCT/GB2020/051476 International Search Report and Written Opinion issued Sep. 4, 2020.

*Primary Examiner* — Ellen Tran
(74) *Attorney, Agent, or Firm* — Erise IP, P.A.

(57) ABSTRACT

A physically unclonable function (PUF) comprises a plurality of conductors, at least some of which are arranged so that they interact electrically and/or magnetically with one another. A media surrounds at least of portion of each of the conductors and further defines at least one cavity, where the cavity is structured to provide the device with an environmentally dependent characteristic. Circuitry applies an electrical challenge signal to at least one of the conductors and receives an electrical output from at least one of the other conductors to generate an identifying response to the challenge signal that is unique to the device.

15 Claims, 2 Drawing Sheets

(56) References Cited

U.S. PATENT DOCUMENTS

| | | | | |
|---|---|---|---|---|
| 2011/0254141 | A1* | 10/2011 | Roest | G06F 21/73 |
| | | | | 257/E29.342 |
| 2015/0137380 | A1* | 5/2015 | In 't Zandt | H01L 23/57 |
| | | | | 438/618 |
| 2016/0359635 | A1* | 12/2016 | Kreft | G06Q 20/3825 |
| 2018/0219673 | A1* | 8/2018 | Young | G09C 1/00 |
| 2018/0294981 | A1 | 10/2018 | Willers | |
| 2019/0325171 | A1* | 10/2019 | Obermaier | H04L 9/3278 |

* cited by examiner

ENVIRONMENTALLY DEPENDENT PHYSICALLY UNCLONABLE FUNCTION DEVICE

RELATED APPLICATIONS

The present application is a national stage application under 35 U.S.C. § 371 of International Application No. PCT/GB2020/051476, filed 18 Jun. 2020, which claims priority to Great Britain Patent Application No. 1908679.2, filed 18 Jun. 2019. The above referenced applications are hereby incorporated by reference.

BACKGROUND

The present invention relates to a Physically Unclonable Function (PUF) device that maps an input (challenge) to an output (response) that is well-defined under specific conditions but difficult to duplicate or reverse-engineer. The invention has applications within device security, authentication, counterfeit protection and tamper-proofing.

Existing Physically Unclonable Functions (PUFs) typically exploit manufacturing differences between identical silicon circuits, however these lack sufficient entropy to be truly unclonable. Alternative PUF types do exist, but these require external read-out circuitry, and are vulnerable to 'black-box' attacks. The proposed invention avoids these issues by providing a novel method of generating an intrinsic response, based on physical characteristics that cannot be easily modeled.

Cryptographic primitives used in encryption assume 3 key features: Secure Key Generation, Secure Key Storage and Secure Execution. Analysis has shown a distinct lack of randomness in commonly used public keys, whilst the contents of said keys can be read directly from non-volatile digital memory even with extensive countermeasures.

Current methods of generating and storing these keys in memory, in such a way that protects them from common types of attack, are both difficult and expensive. PUFs offer new cost-effective ways through which these keys can be securely generated and protected from malicious actors. They were first proposed with a view to identifying individual ICs by their manufacturing defects. PUFs work by generating a key that is unique to the device, based on some physical characteristic of the device itself. The key is generated and read out by challenging the PUF, measuring the response and then performing some form of computation.

As the key is generated by the physical characteristics and manufacturing variabilities of the device, it should be impossible to create a physical copy or accurately model the response of the system to simulate it in software. If some individual attempts to measure the response of the PUF when subject to a challenge, the response should change sufficiently to invalidate the PUF, and protect the secret contained within the PUF. The lack of interchangeability between the challenges and responses leads to the idea of the Challenge-Response Pair (CRP)—each challenge maps directly to one response.

As the ideal PUF cannot be copied or modeled, it is truly unclonable, and so a key generated or stored by the PUF cannot be illegitimately extracted/copied. Additionally, the generated response must be reproducible, once variations in environmental conditions, such as temperature and humidity are accounted for, and the time to generate a response should be neither too fast (reducing the time required to collect CRPs for a brute force attack) or too slow (reducing the availability of any function relying on the PUF).

PUFs have many applications:

Remote Challenge-Response Authentication: A simple example of this is password authentication, where the challenge is the request and the response the correct password. In the case of a PUF, one or more CRPs would be collected from the device during a registration stage. The device can subsequently be checked for authenticity by issuing a challenge and getting the desired response in return. The correct responses are not stored within the PUF, but are generated as a function of its physical structure, so the PUF is inherently robust to invasive attacks (that may attempt to read stored secrets). Many challenge-response pairs could be registered, so that each pair would only need to be used once (a one-time password), meaning that the system would be robust against replay attacks. The system doesn't require continuous power, or time synchronization, unlike other 1-time authentication systems.

Encryption Relationship Management: The response of the PUF to a given challenge could be used to form a private encryption key. Again, the key would not be stored within the PUF itself, rendering it robust to invasive attacks.

Encryption Key Storage: Consider a situation where a field-programmable gate array (FPGA) is used to perform a custom process, and utilizes an encrypted stream requiring the physical storage of a private key. This private key may therefore be vulnerable to a physical attack. By generating the key each time it is required, thus not storing it in electronic memory, the key is no longer vulnerable to unauthorized read-out.

Object Authenticity Verification: In this use-case, the PUF may either be embedded within the object to be verified, with some sort of external readout mechanism, or alternatively, the PUF may entirely enclose the physical object to be protected, and the challenge-response mechanism may be used to either ensure that the enclosed physical object has not been tampered with, or even to provide the code to a physical unlocking mechanism, which requires a complete challenge-response pair to unlock. Any attempt to interfere with the enclosure should change the response of the PUF and then be obvious to the possessor of the correct challenge-response pair(s).

However, current PUFs can either be accurately modeled or lack sufficient entropy to act as a true security layer for secure key storage. PUFs exploiting manufacturing differences within a FPGA are too easily measured using low-cost equipment and modellable; the secure keys generated using initial SRAM states are too easily read-out; and current EM-based PUFs are expensive and/or have a limited number of challenge-response pairs, allowing for potential replay attacks.

SUMMARY

Embodiments of the PUF of the invention can solve these issues as:

The number of Challenge-Response pairs is large, based on the selection of conductors in the PUF, and the signal frequency, phase and amplitude.

The full challenge-response mechanism can be enclosed within the PUF, preventing external measurement of the PUF properties.

The PUF cannot be readily modeled due to the complex interaction of the conducting paths embedded within the surrounding media The interaction of the conducting paths can be made even more complex and unpredictable in embodiments by using a heterogeneous media having an irregular nature surrounding the conducting paths Any attempt to probe the PUF will affect the measured response.

The PUF can be used to encapsulate any sensitive electronics, reducing the opportunity for an adversary to measure the PUF output.

The PUF can be designed such that the PUF only generates the correct response in the expected operating environment.

There are several examples that constitute prior art in the field of PUFs. These show methods to implement PUFs on FPGAs and derive the true response from a noisy output. One example is U.S. Pat. No. 9,390,295, which relates to a capacitive security shield PUF. Whilst the option to choose the paths upon which to measure the response is disclosed in this prior art, the present invention has a greater configurability as it provides a PUF whose challenge can be modulated in frequency, amplitude and phase, increasing the number of possible CRPs and the effective entropy of the device.

Existing PUFs typically seek to minimize the effect of the environment, specifically temperature and voltage fluctuations, on the response generated by the PUF. However, for some applications, it may be beneficial to add a dependency of the PUF on some environmental conditions, such that the response is invalidated when the challenge-response pair generation system is activated in a foreign environment, thereby adding a further layer of protection against attack. By incorporating this dependency into the physical design of the PUF, this dependency will be difficult to detect without access to the initial design data.

The proposed invention exploits the interaction of multiple conducting paths embedded within a media, such that there exists a complex electrical and magnetic coupling between each permutation of the conducting paths.

The invention exploits the intrinsically complex and unpredictable electrical and magnetic interactions between numerous conductive paths and the media in which they are embedded. A subset of the conductive paths is excited by a modulated signal of selectable amplitude, frequency and phase generating the challenge, and the response is detected on some other paths. The nature of the PUF means that it can also be deployed in a variety of form factors, including enveloping a circuit to be protected. Any attempt to penetrate this protective circuit, or to listen to the challenge-response pairs, will invoke a sufficient change in the electrical and magnetic interaction between conductive paths to invalidate the response of the PUF. The media and arrangement of the conducting paths should be sufficiently different between devices to ensure that each PUF is unique, whilst also maintaining the unpredictability of the PUF response.

The proposed invention seeks to utilize environmental changes, such as pressure, humidity, magnetic field, electric field, atmospheric composition, light/radiation levels and temperature fluctuations, to physically alter the internal structure of the PUF (and/or the distribution of material within the PUF) to build an operating window into the PUF design.

In a preferred embodiment, the electrical and magnetic interactions are made more complex through the explicit introduction of heterogeneity in the surrounding media, for example through irregular distribution of some material through at least a part of the surrounding media. An example would be to introduce localized regions of iron filings within the media, however the addition of any suitable conductive, dielectric, ferroelectric, magnetic or ferromagnetic material or localized doping of the media, or combinations thereof, will explicitly introduce heterogeneity into the surrounding media. Further complexity arises from the use of non-linear and/or anisotropic materials thus distributed through the media. Cavities may be defined by or included in the media in order to further increase the complexity of the interactions and device and to introduce greater environmental dependency to the PUF. These cavities may themselves contain environmentally sensitive materials.

According to the present invention, there is provided a physically unclonable function (PUF) device comprising:

a plurality of conductors, at least some of which are arranged so that they interact electrically and/or magnetically with one another;

a media surrounding at least a portion of each of the conductors, the media defining at least one cavity, wherein the cavity is structured to provide the device with an environmentally dependent characteristic; and circuitry for applying an electrical challenge signal to at least one of the conductors and for receiving an electrical output from at least one of the other conductors to generate an identifying response to the challenge signal that is unique to the device.

BRIEF DESCRIPTION OF DRAWINGS

Examples of the present invention will now be described with reference to the accompanying drawings.

DETAILED DESCRIPTION

Figure 1:
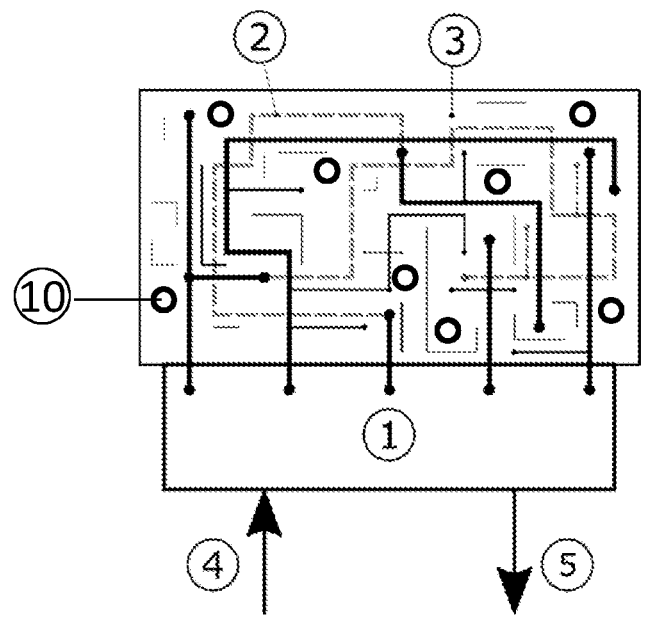
FIG. 1 shows a schematic diagram of an example PUF device according to the invention.

FIG. 1 shows a simplified conceptual diagram of the PUF network, with a reduced number (eg. five) of conducting paths 2 spread across two layers (solid black and dashed grey). The surrounding media 3 is, in this example, heterogeneous and is different for each PUF. Cavities 10 are defined by the media 3 in order to increase the environmental dependency characteristics of the PUF. The PUF interface circuitry 1 applies electrical stimuli to a subset of the conducting paths. The interface circuitry 1 or an external challenge input 4 determines the selection of paths; and amplitude, phase and frequency of the stimuli applied to these paths.

The currents induced, in response to the challenge, within a different subset of conducting paths are received by the circuitry 1 and provide an identifying response 5 which is output from the PUF. The output 5 will be application specific, derived from the behaviour of the PUF 2, 3 and inference by circuitry 1.

Construction of the PUF Element

The conducting paths may be arranged such that all paths have a good probability of interacting in the absence of the heterogeneous media. This arrangement of the conducting paths ensures that the response of the PUF instantiation is unpredictable. The arrangement of the paths may be calculated by an optimization algorithm whereby the cost function is related to the deviation of the integrated path couplings. The path routing may also be changed between different instantiations of the PUF, provided the integrated coupling along the lengths of each path to all others is sufficient to provoke a complex, non-predictable, tamperproof response.

The conducting paths may comprise electrically insulated wires overlapping one another; be embedded within a substrate material with vias to allow for overlapping routing; or be formed from a complex media of mixed permittivity, permeability and conductivity. The heterogeneous media surrounding the conductors may then be applied in the form of some setting material such as epoxy, or by 'doping' existing substrate material such as FR4.

Cavities may be defined by the media or introduced to the media through a range of methods. For example, fluid may be injected into the media before it has set. Alternatively, fluid may be injected into an extrusion screw as the heterogeneous mixture is injection moulded around the areas of the PUF to be protected. Further alternatively, loading materials, such as glass fibres, may be introduced into the heterogeneous media to cause poor flow of the media around features of the PUF; the flow around these features would therefore lead to local pockets of air within the media.

PUF Interfacing

The interface circuitry 1 between the PUF device and any application may be application specific. In a digital circuit, the challenge and response may be digital signals, which might be converted into analogue stimuli by the PUF interface. Alternatively, the challenge and response could themselves be analogue, in which case they may not need conversion before being transmitted to the conducting paths.

The circuity 1 for encoding challenges into the appropriate waveforms may be implemented as an Application Specific Integrated Circuit (ASIC), or by a combination of commercial off-the shelf components enclosed within the effective tamperproof region. This may also provide control access to the PUF, reducing the effectiveness of 'brute force' attacks by limiting the number of challenge-response pair requests within a given period.

Figure 2:
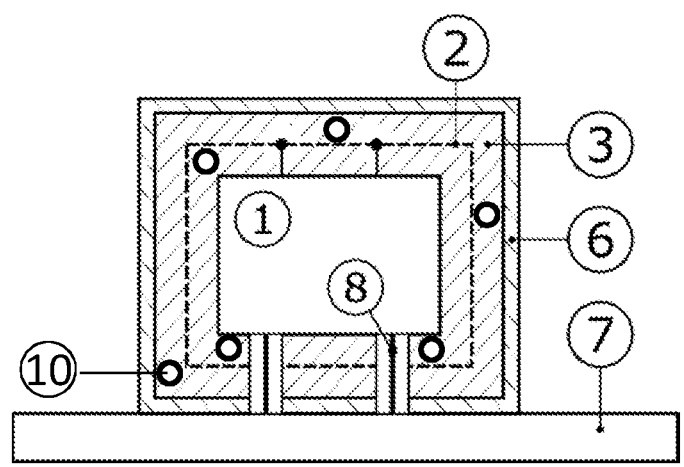
FIG. 2 shows a schematic diagram of an example stand-alone PUF device according to the invention.

In one embodiment, the PUF device may be a self-contained, standalone element. This is shown in FIG. 2. In this arrangement, the PUF is protecting the relationship that maps challenges to responses, i.e. the control electronics 1 for the PUF. The PUF interface 1 is contained within the PUF network (the conducting paths 2 in heterogenous media 3 which defines a plurality of cavities 10). It is difficult to reproduce the precise arrangement and nature of the conducting paths within the heterogeneous media, making it difficult to clone the PUF. Furthermore, exact replication of the placement of the cavities, and distribution of any materials contained within, will be difficult. Containment 6 may be provided to surround the PUF, and provide physical protection/robustness. This can also include a metallic component/ground plane to inhibit electrical measurement of the PUF. This containment element is not essential to operation of the PUF device however. The PUF device is shown mounted on a supporting structure 7, such as a printed circuit board) for clarity, although this is not key to operation of the PUF, and is not essential. Interconnects 8, pass through the heterogeneous media and containment to the circuit board to allow for communication between the PUF and the application circuit.

Figure 3:
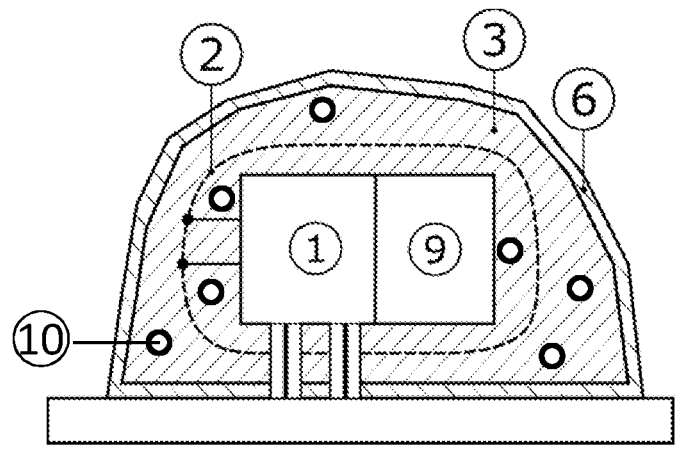
FIG. 3 shows a schematic diagram of an example PUF according to the invention which encases other components.

In another example, the PUF network may be used to fully/partially enclose other elements to provide protection to those elements, this is shown in FIG. 3. The PUF interface 1 and other protected components 9 are contained within the PUF network 2,3,10. For example, the protected components could be a microprocessor and encrypted storage module. In this case, the PUF can be used to generate the encryption key for the storage module. The PUF network has been formed around the interface electronics and protected components, and is connected to the interface internally. Attempts to disassemble or probe inside the PUF will cause a change in the electrical properties of the PUF network, leading to a change in the response generated for a given challenge, and preventing decryption of the storage module. Communication with the rest of the circuit can then be performed via the interconnects to the PCB.

If the control electronics are embedded within the PUF, they should also include means to correct any errors to ensure a repeatable key is produced within the required response time. This may be fuzzy logic, such as a fuzzy extractor, that ensures that small changes in the physical response (e.g. noise) do not lead to changes in the response.

In both FIGS. 2 and 3, the PUF element is shown as a dashed line to illustrate how it encloses the components to be protected. However, in a practical implementation the conducting paths 2 would extend to the edges of the heterogeneous media 3, with secondary conduction paths (due to the media and any additives) extending throughout the entire volume of the media.

The entire device may be fixed to a solid structure, or made flexible and shaped to the desired form factor for the initial registration process. The material and substrate selection may also be altered to adjust the entropy of the system, and to meet other constraints of the system such as thermal control. If appropriate to the application, the device may then be also enclosed within a ground plane, forming a Faraday cage, to shield the unit from external electromagnetic interference and prevent side-channel attacks on the unit.

In use the PUF is passed a challenge from an external circuit via the PUF Interface 1. The interface 1 converts the request, which could be received as a serial command, to a challenge which can be fed into the PUF device. For example, in an instantiation with ten conducting paths, four may be stimulated with a signal (of varying waveform shape, frequency, amplitude and phase offset), with the response measured on any number of the other six paths. The presence of non-linear materials, such as ferro-magnetics, within the heterogeneous media will introduce a dependency of the response to the amplitude of the challenge. Furthermore, eddy currents within the media will alter the response detected by an individual conductor and introduce a frequency dependence. The received signals on each of the response wires are then converted into a response vector, which may then be converted back to a serial stream via the PUF interface 1 and fed back to the circuit. A serial example is provided here, but may also be implemented by a parallel bus or any other electrical interface circuitry.

Between challenges, the number of paths involved in the challenge may change, as may the number of paths used to detect the response. The specific paths used within each challenge may be changed, or kept the same between different challenges. Similarly, the conductors 2 used to detect the response may also change between each challenge.

The electrical and/or magnetic interactions between conductive paths, used to generate the CRPs, may depend on properties such as the permittivity, permeability and conductivity of the conductors 2 and media 3. The presence of a cavity 10 within the media 3 of the PUF will impact on the distribution of the media 3 and the non-linear materials within the media.

More specifically, using the example of a pressure sensitive implementation, the presence of a cavity 10 will cause a local lack of the non-linear materials within the media, with a minimum volume equal to the volume of the cavity 10. If the media 3 is impermeable to fluid, when the pressure around the PUF changes the volume of the cavity 10 will adjust to match the pressure of the surrounding environment. Changes to the volume of the cavity 10 will alter the distribution of the media 3 and the interactions between conductive paths. Thus, if the device is challenged outside of its intended pressure window, the cavity 10 will either expand (if the correct location is at a lower pressure than the current pressure) or contract (if the correct location is at a higher pressure), thereby altering the interactions of the PUF and invalidating the PUF response. At the intended operating pressure (for example at a specific depth or altitude) the cavity 10 will have a volume which allows for the generation of the correct key from the set of applied challenges (in the absence of attempts to measure the device).

Other environmental conditions which may similarly impact the operation of the PUF include the temperature, the humidity, magnetic field, electric field, atmospheric composition, illumination, light/radiation levels and temperature fluctuations.

The frequencies of conductor excitation may be in the audio range, utilizing low cost and readily available transmit/receive electronics, or may operate at higher frequencies to develop a more complex electromagnetic interaction in which time delays become significant, and at which physical effects such as the skin effect play a large role in the interaction between the conductors.

In addition to the environmental sensitivities, if an adversary attempts to probe the PUF device to measure the electrical characteristics of the instantiation, the presence of the probe should cause a sufficient deviation of the response for a given challenge to invalidate the PUF, and render the device temporarily unreadable.

The initial registration process will be dependent on the use of the proposed invention, but is a necessary step to use the PUF device in a practical implementation. For remote authentication, the challenge-response pairs may be queried and stored securely during a registration process. For secure key storage, this is a one time and irreversible procedure.

As previously noted, environmental factors such as temperature may influence the response of the PUF. Depending on the intended operating environment of the PUF, it may be necessary to mitigate one or more of these factors. Factors such as humidity may be mitigated by instantiating the PUF within a hermetically sealed enclosure. Measurements of other parameters, for example by use of a thermocouple in the control ASIC, may then be used in the generation of a challenge to the PUF. Furthermore, the temperature of the PUF can be locally controlled as part of the challenge process, further increasing the difficulty of modeling the PUF device response.

Controlling the temperature, for example through the addition of dedicated heating wires, can introduce an additional level of complexity to the challenge (by influencing the size of the cavities 10). Alternatively, this can be used to calibrate out the effect of temperature on the volume of the cavity and so reduce the reliance on the fuzzy extractor for the generation of the key, thereby maximizing the embodied entropy of the PUF.

The invention claimed is:

1. A physically unclonable function (PUF) device comprising:
   a plurality of conductors, at least some of which are arranged so that they interact electrically and/or magnetically with one another;
   a media surrounding at least a portion of each of the conductors, the media defining at least one cavity, wherein the cavity is structured to impact the distribution of the media by providing the device with an environmentally dependent characteristic,
   wherein the environmentally dependent characteristic depends on at least the pressure in the environment surrounding the device, such that the volume of the at least one cavity is dependent on the pressure; and
   circuitry for applying an electrical challenge signal to at least one of the conductors and for receiving an electrical output from at least one of the other conductors to generate an identifying response to the electrical challenge signal that is unique to the device.

2. The device according to claim 1, wherein the cavity defined by the media is an impermeable enclosure.

3. The device according to claim 1, wherein the environmentally dependent characteristic is permittivity and/or permeability.

4. The device according to claim 1, wherein the environmentally dependent characteristic depends on at least one of the temperature, humidity, magnetic field, electric field, light/radiation levels and type of fluid in the environment surrounding the device.

5. The device according to claim 1, and further comprising temperature variation means to vary the temperature of the device and in which the circuitry generates an identifying response which varies with the temperature of the device.

6. The device according to claim 5, wherein the temperature variation means is heating wires arranged in the device.

7. The device according to claim 1, wherein the conductors comprise electrically insulated wires overlapping one another; are embedded within a substrate material with vias to allow for overlapping routing; or are formed from a complex media of mixed permittivity, permeability, and conductivity.

8. The device according to claim 1, wherein the circuitry for applying the electrical challenge signal is arranged to vary the conductors to which the electrical challenge signal is applied and/or the conductors from which the response is received after each electrical challenge signal is applied to the device.

9. The device according to claim 1, wherein the circuitry for applying the electrical challenge signal is arranged to vary the number of conductors to which the electrical challenge signal is applied and/or the number of conductors from which the response is received after each electrical challenge signal is applied to the device.

10. The device according to claim 1, wherein the circuitry is encased within the media encompassing the conductors.

11. The device according to claim 1, wherein the electrical challenge signal is a first electrical challenge signal, and wherein the said circuitry is arranged to apply at least a second electrical challenge signal to at least one of the conductors and to receive at least a second electrical output from at least one of the other conductors to generate an identifying response to the first electrical challenge signal that is unique to the device.

12. The device according to claim 11, wherein the second electrical challenge signal is applied to a different set of conductors than the first electrical challenge signal.

13. The device according to claim 11, wherein the electrical output is a first electrical output, and wherein the second electrical output is received from a different set of conductors than the first electrical output.

14. The device according to claim 1, wherein the electrical and/or magnetic characteristics of at least a region of the media are heterogeneous.

15. The device according to claim 14, wherein the heterogeneity is created through the irregular distribution of a material through said region of the media.

* * * * *